United States Patent [19]

Drebinger et al.

[11] 4,079,357
[45] Mar. 14, 1978

[54] PROCESS FOR FAULT RECOGNITION IN A VEHICLE LOCATING SYSTEM

[75] Inventors: Klaus Drebinger; Karla Oberstein; Peer Thilo, all of Munich, Germany

[73] Assignee: Siemens Aktiengesellschaft, Berlin & Munich, Germany

[21] Appl. No.: 683,402

[22] Filed: May 5, 1976

[30] Foreign Application Priority Data

May 22, 1975 Germany .................... 2522725

[51] Int. Cl.² ............... H04B 17/00; H04B 3/46; G08C 25/00; G01S 9/56
[52] U.S. Cl. ............... 340/149 R; 179/15 BF; 179/175.3 R; 325/363; 340/248 R; 340/185; 343/17.7
[58] Field of Search ............... 340/149 R, 213 R, 185, 340/146.1 R, 146.1 BE, 146.1 C, 184, 248 R; 179/175.3 R, 175.2 R, 175.2 C, 15 BF; 325/2, 53, 65, 305, 363, 42, 67, 364; 328/162; 343/202, 17.7

[56] References Cited

U.S. PATENT DOCUMENTS

| | | | |
|---|---|---|---|
| 3,407,355 | 10/1968 | Clark et al. ................ | 325/363 X |
| 3,470,331 | 9/1969 | Barash et al. ............... | 179/175.3 |
| 3,543,161 | 11/1970 | Hatton et al. ............... | 325/53 X |
| 3,646,580 | 2/1972 | Fuller et al. ................ | 325/53 |
| 3,662,267 | 5/1972 | Reed .......................... | 325/53 |
| 3,755,741 | 8/1973 | Stover ........................ | 325/363 |
| 3,769,454 | 10/1973 | Liberman et al. ............ | 179/175.3 |

*Primary Examiner*—Donald J. Yusko
*Attorney, Agent, or Firm*—Hill, Gross, Simpson, Van Santen, Steadman, Chiara & Simpson

[57] ABSTRACT

In a process for fault recognition in a vehicle locating system, measuring signals are emitted from a vehicle which is to be located and are in each case received by a plurality of separately arranged receiving stations and forwarded, via lines, to a central station for analysis. The measuring signals received in the individual receiving stations are each supplied to checking devices which establish signal adulterations and analyze the latter to form fault signals. In the central station these fault signals are employed, by way of logic links, for the acquisition of specific disturbance reports.

7 Claims, 5 Drawing Figures

PROCESS FOR FAULT RECOGNITION IN A VEHICLE LOCATING SYSTEM

BACKGROUND OF THE INVENTION

1. Field of the Invention

The present invention relates to a process for fault recognition in a vehicle locating system, in which measuring signals emitted from the vehicle which is to be located are received by a plurality of separately arranged receiving stations and are forwarded via lines to a central station for analysis.

2. Description of the Prior Art

A system for vehicle locating of the above-mentioned type is described, for example, in the German published application No. 2,137,846, where the differences in transit time between the signals arriving at the individual receiving stations are analyzed in accordance with a hyperbolic process. Therefore, in this, and in similar locating systems, in addition to a central control, a plurality of receiving stations are provided. To these components must be added the transmitting devices in all of the vehicles which are to be detected by the locating system, and the number of such devices can amount to several hundred. Also contained in the above-mentioned locating system is one or more stationary comparison transmitters which likewise possess devices for the emission of the measuring signal. Also required are one or more call-up transmitters, which serve to request the particular vehicles to be located to emit their measurement tone. Therefore, a system for vehicle location contains a plurality of components whose operating reliability is of great significance. In particular, the peripheral devices in the vehicles and in the receiving stations are difficult to manually service and check in the normal manner. In order, however, to ensure the accuracy and reliability of the locating process, it is necessary to localize and eliminate disturbances in the system as rapidly as possible.

SUMMARY OF THE INVENTION

Therefore, the object of the present invention is to provide a process and corresponding devices for automatic fault recognition and fault localization in a locating system of the type generally described above.

In accordance with the invention, this object is achieved in that the measuring signals received in the individual receiving stations are each fed to checking devices which establish signal adulterations and analyze the latter in order to form fault signals. These fault signals are then employed in the central station, by way of logic links, in order to acquire specific disturbance messages.

According to the present invention, the process has the advantage that, on the occurrence of disturbances, it can be immediately detected in the central control whether the fault is occurring and the nature of the fault. Therefore, in the central control an immediate decision can be made as to whether or not the received measurement values can still be employed for analysis. At the same time, an immediate and reliable elimination of the disturbance can be brought about. The carrier frequency can serve, for example, as a checking criterion for the measuring signals incoming at the receiving stations. Deviations of this carrier frequency from its theoretical value are then fed, as a frequency fault signal, to the central station. It is also possible in the process of the present invention to use the checking devices to monitor the level of the incoming measuring signals, and in the event of deviations from a given level range, to produce a level fault signal. In addition, the measuring signals are expediently monitored for noise, so that in the presence of a noise voltage, a noise signal is available as a further fault criterion. The level monitoring and the checking for noise are advantageously effected in the central station on the lines incoming from the individual receivers, so that the lines are also additionally monitored.

The logical combination of the fault signals in the central station can, for example, be effected in such a manner that fault signals which occur simultaneously and in the same manner in all of the receiving stations, are analyzed by way of an AND gate as a disturbance signal for a specific vehicle. On the other hand, logical combinations can be utilized to provide that measuring signals which are only recognized as faulty in one receiving station, are analyzed in order to form a disturbance signal for this receiving station. It is also expedient for the disturbance signals formed by way of the logic links to each be fed to a counter, and that a disturbance message is not emitted until a given count is reached. This ensures that on the occurrence of individual random faults, a vehicle or receiver will not immediately be reported as being defective. Here, it is also possible to reset the aforementioned counter as soon as a fault report is followed by at least one fault-free measuring signal.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
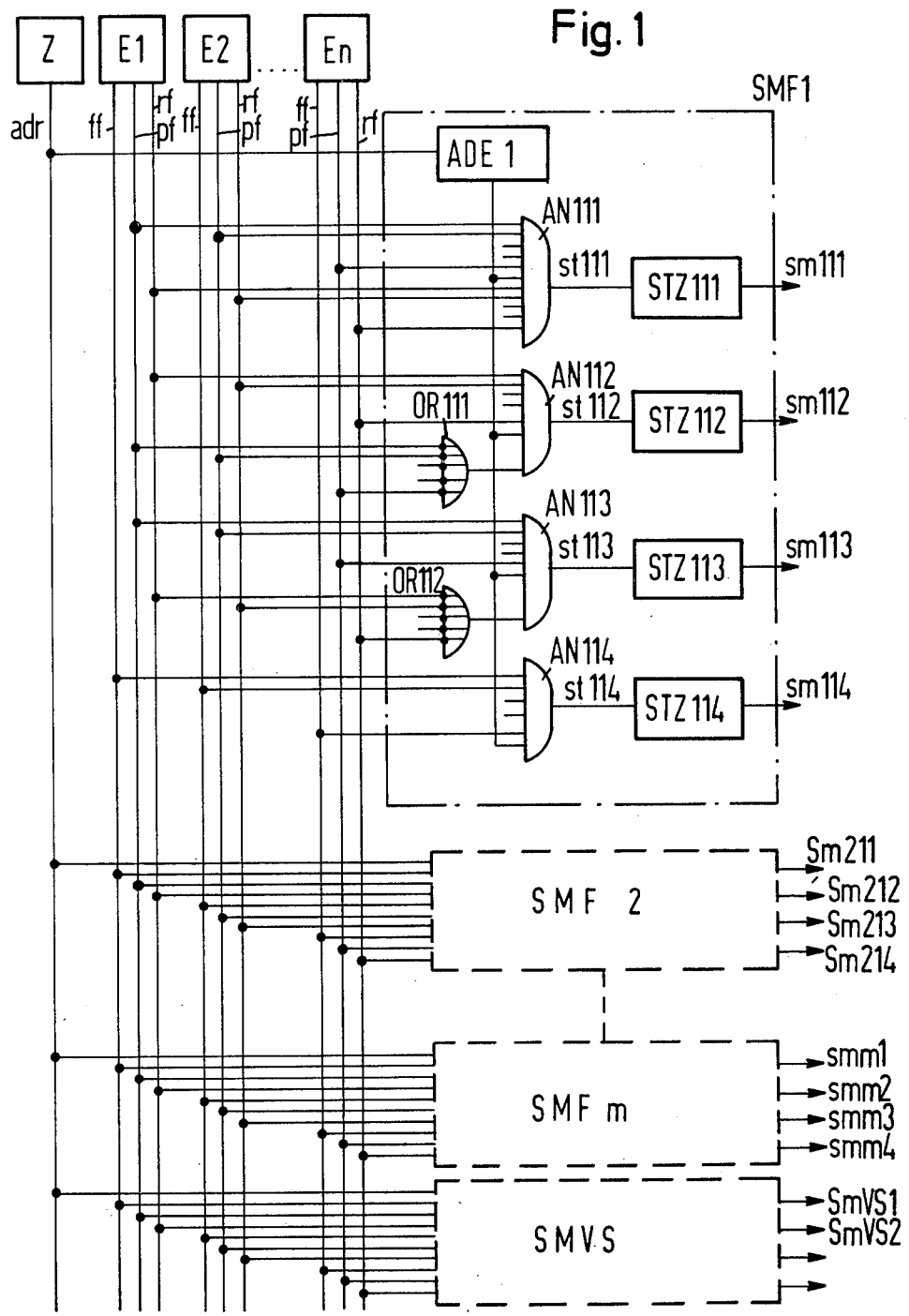
FIG. 1 is a schematic logic diagram illustrating logical combinations of various fault signals for the acquisition of specific disturbance reports.
Figure 2:
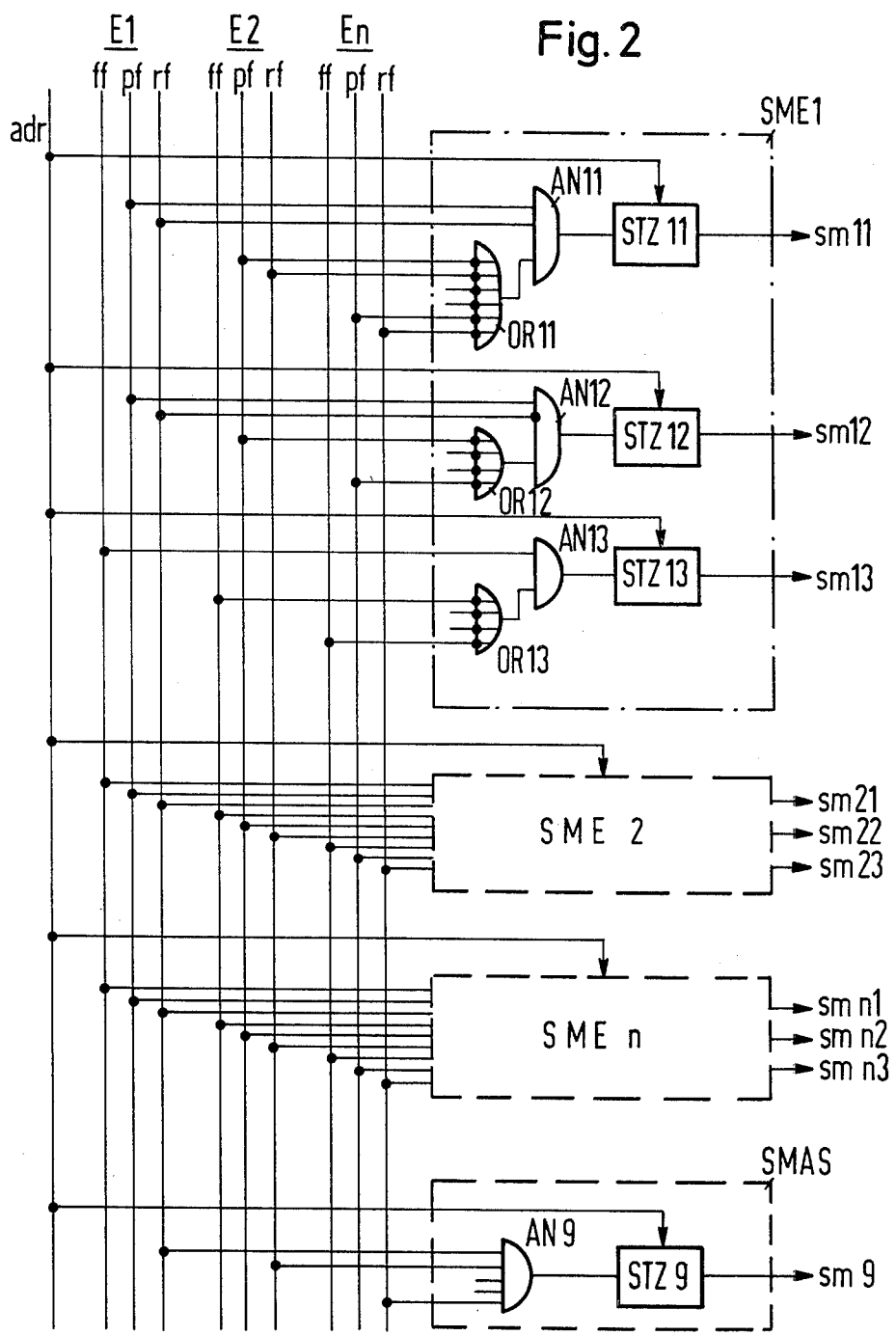
FIG. 2 is another schematic logic diagram illustrating logical combinations of various fault signals for the acquisition of specific disturbance reports.

FIGS. 1 and 2 illustrate the logical combinations of the individual fault signals, for the acquisition of specific disturbance reports. The individual fault signals which are to be logically linked are obtained from the measuring signals which are transmitted from the vehicles in the locating system and are received in the individual receiving stations E1, E2 . . . En. The measuring signals are forwarded in a well known manner to the central station where there differences in transit time are analyzed in order to establish the location of the vehicle. The assignment between measuring signal and vehicle is effected, for example, in that in accordance with a known selective call process, each vehicle is requested by a call-up transmitter from the central control to emit the measuring signal. This address signal adr, which emanates from the central control Z or a call-up transmitter, is logically linked with the fault signals for the purpose of fault recognition.

Figure 3:
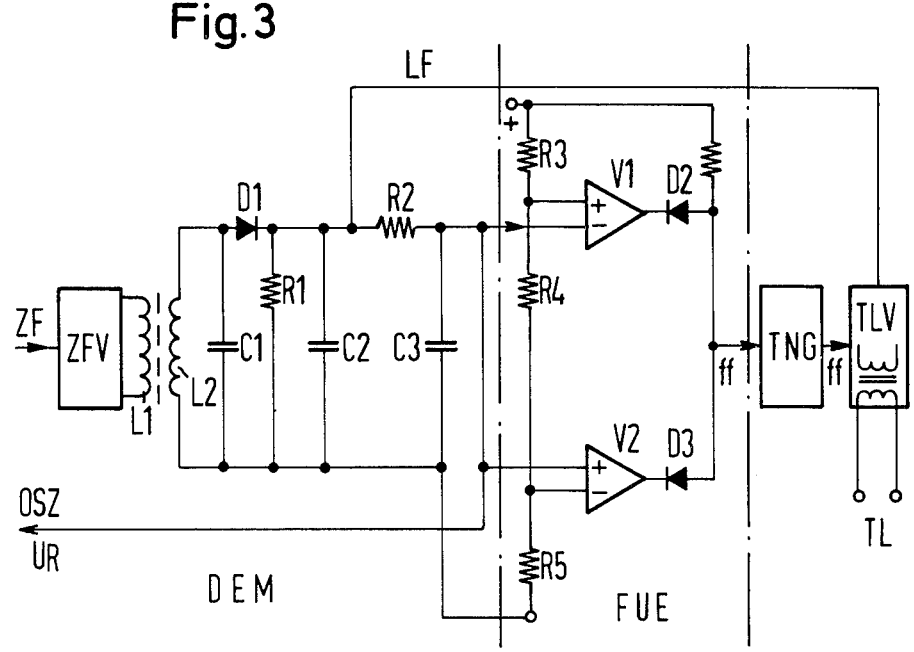
FIG. 3 is a schematic circuit diagram of an arrangement of the acquisition of a frequency fault signal.
Figure 4:
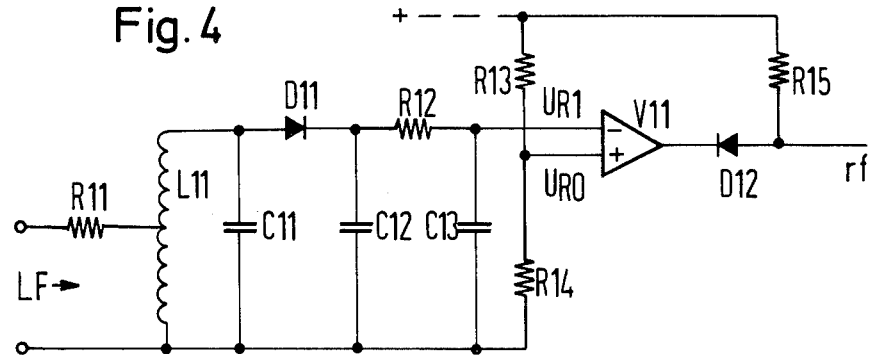
FIG. 4 is a schematic circuit diagram of an arrangement for the acquisition of a noise signal.
Figure 5:
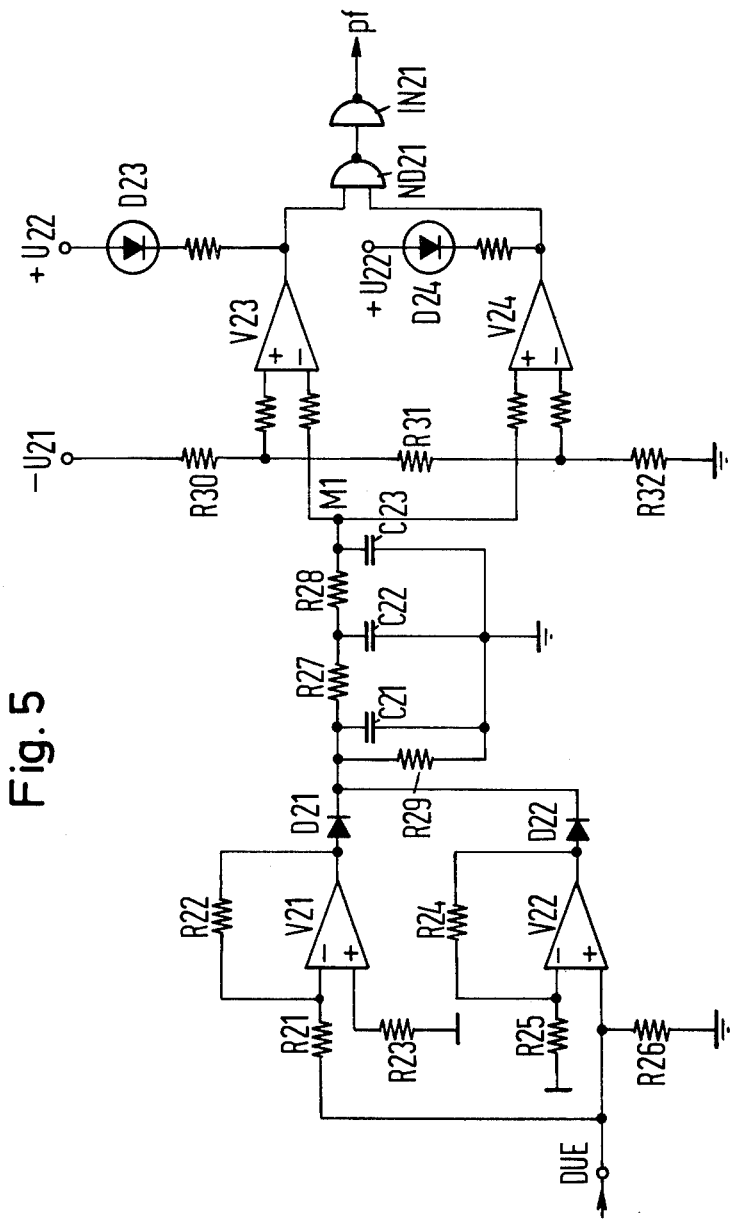
FIG. 5 is a schematic circuit diagram of a level monitoring arrangement for the acquisition of a level fault signal.

The measuring signals which are received in the individual receiving stations are checked for signal faults by way of specific checking devices (FIGS. 3-5). This is carried out either in the receiving stations themselves or, on the arrival of the relevant measuring signals, in the central station. In the present example, three possible signal faults are analyzed for the disturbance report, namely the frequency fault of the carrier frequency, the level fault and the noise. Thus, three possible fault signals can arrive from each of the receiving stations E1--E$n$, namely a frequency fault signal $ff$, a level fault signal $pf$ and a noise signal $rf$.

The logical combination of the fault signals is carried out in disturbance report devices, for example in a disturbance report device SMF1 for the vehicle 1, SMF2 for the vehicle 2, etc. By way of AND gates AN111, AN112, etc, disturbance signals are produced from the fault signals and are then statistically analyzed. By way of an address decoder ADE1 it is ensured that the fault analysis is effected for the correct vehicle. This address decoder is supplied with the address signal adr with each vehicle call-up and is not forwarded to the disturbance report device, thus the device SMF1 until the relevant address decoder, thus ADE1 responds and therefore indicates that the vehicle 1 has been called up for locating purposes. A disturbance in the relevant vehicle 1 is established, for example, when the measuring signal of this vehicle is disturbed by noise in all of the receivers E1-E$n$, and when all the noise levels are incorrect. In this case, the AND gate AN111 receives tha fault signals $pf$ and $rf$ from each receiving station and then emits a disturbance signal $st$111. However, this disturbance signal $st$111 is not immediately emitted, but is first of all fed to a counter STZ111. If the same fault occurs several times in a series in respect of the same vehicle, so that the counter reaches a given count, the counter emits a disturbance report $sm$111. This disturbance report is then displayed in a known manner, for example by means of lamps, or is output via a printer.

Specific disturbance reports are achieved in the disturbance report device by means of further logic links. If, for example, all of the measured values are disturbed by noise over a plurality of locations in respect of a vehicle, but the level is correct for at least one receiver, then by way of an OR gate OR111 having inverted inputs and an AND gate AN112, and via the disturbance counter STZ112, a disturbance report $sm$112 is produced which indicates that the HF power in the vehicle communication device is too low. Similarly, the disturbance report $sm$113 serves to indicate an incorrect LF level in the case of the vehicle 1 when all of the receivers have level faults over a plurality of locations in respect of this vehicle, although there is no noise disturbance in the measurements. If, on the other hand, frequency faults were established in all receivers over a plurality of locations in respect of the vehicle 1, the disturbance report $sm$114 serve to indicate an incorrect carrier frequency with respect to the vehicle 1.

In the same way as for the vehicle 1, the fault analysis is effected for the other vehicles in the disturbance report devices as soon as the relevant vehicles are called up by way of the address signal adr to emit the measuring signal. If, as described in the aforementioned German published application No. 2,137,846, a comparison transmitter or calibration transmitter is additionally provided, the measuring signals thereof are checked for faults in the same manner as the signals of the vehicles, and faults of the comparison transmitter are analyzed and reported in the disturbance report device SMVS.

FIG. 2 illustrates the fault analysis arrangement for disturbances in the receiving stations which are detected by way of logical links, similarly to disturbances of the vehicles. Again, the same fault signals are available from the receiving stations, namely the frequency fault signal $ff$, the level fault signal $pf$ and the fault signal for noise $rf$, and likewise the address signal adr for calling up the individual vehicles. This address signal $adr$ serves merely as a counting pulse train in the fault recognition scheme for the receivers. The fault analysis is effected, for example, for the receiving station E1 in the disturbance report device SME1 having AND gates AN11-AN13, having OR gates OR11-OR13, and having counters STZ11-STZ13. If, for example, the measured values exhibit noise disturbance over a plurality of locations only in the receiver E1, and the level is indirect only in the case of this receiver, a disturbance report $sm$11 is emitted which indicates that the receiver or the line, or also the receiving component for this receiver in the central control is defective. If, on the other hand, level faults are established over a plurality of locations in one receiver (E1), although the measured value possesses no noise disturbance, then by way of the disturbance report $sm$12 it is indicated that the LF part of the receiver or the line, or else the receiving device in the locating control unit for this receiver is defective. If, finally, one single receiver exhibits frequency faults over a plurality of locations, the disturbance report $sm$13 indicates a defective frequency control in the case of this receiver. In this same manner, each receiver is assigned a disturbance report device SME1-SME$n$.

Finally, FIG. 2 illustrates a further disturbance reporting device SMAS having an AND gate AN9 and a counter STZ9, which serves to indicate disturbances in the call-up transmitter. Here, a disturbance report signal is obtained whenever all of the measured values for all of the receivers exhibit noise disturbances over a plurality of locations. This is a reliable indication that the call-up transmitter is disturbed and thus none of the vehicles is transmitting the measured signal.

FIG. 3 illustrates a simple circuit arrangement for frequency monitoring in a receiving station, which in the event of deviations of the carrier frequency from a given value, feeds a frequency fault signal to the central control. In accordance with the circuit arrangement illustrated in FIG. 3, an intermediate frequency ZF in the receiving station is fed by way of an intermediate frequency amplifier ZFV and a transformer L1, L2 to a demodulator DEM. If the received HF carrier frequency deviates from its reference value, in the demodulator DEM a regulating voltage is formed which tunes the receiver crystal oscillator OSZ in such a manner that the intermediate frequency ZF exactly assumes its theoretical value, for example 455 kHz. From this regulation, a d.c. voltage is derived which corresponds to the value of the HF carrier deviation. If the theoretical frequency is now 455 kHz, the oscillating circuit L1, C1 is adjusted, for example, to 450 kHz. If the frequency fluctuates around 455 kHz, a change occurs in the voltage which has been rectified by way of a diode D1, a resistor R1 and a capacitor C2. The time constant of the resistor R1 and the capacitor C2 is designed to be such that the low frequency voltage LF (e.g. 3kHz) is barely attenuated. The other filter element comprising a resistor R2 and a capacitor C3 withdraws the low frequency LF so that the regulating voltage $U_R$ is a gauge for the mean frequency deviation of the carrier frequency from the theoretical frequency 455 kHz.

From the demodulator DEM, the regulating voltage $U_R$ is fed to the frequency monitoring unit FUE. In the normal state, the regulating voltage $U_R$ is between the voltages $U_{Rmin}$ and $U_{Rmax}$, which are established with a voltage divider comprising a plurality of resistors R3, R4 and R5. A pair of amplifiers V1 and V2 are then positive at their outputs and no current flows through the subsequently connected diodes D2 and D3. The signal "frequency fault" ff is likewise positive. If the voltage $U_R$ exceeds the value $U_{Rmax}$, the output of the amplifier V1 becomes negative, the diode D2 becomes conductive and the signal ff becomes negative. If the voltage $U_R$ falls below the value $U_{Rmin}$, the amplifier V2 becomes negative at its output and the diode D3 becomes conductive. Therefore, in this case, the signal ff is negative. Generally speaking, the voltage comparators which are formed by the amplifiers V1 and V2 are adjusted in such a manner that in the case of a HF carrier deviation of more than 1 kHz, the signal ff appears at the output of the frequency monitoring unit. With this signal, an audio-frequency generator, for example having a frequency 350 Hz, is switched on; this sound passes by way of a telephone line amplifier TLV to the telephone line TL, where it is superimposed onto the low-frequency measuring signal LF and is fed to the central station. A corresponding audio-frequency receiver is arranged in the central control and responds whenever the frequency fault tone of 350 Hz is present on the line. This signal ff obtained in this manner is then analyzed in accordance with the arrangements of FIGS. 1 and 2.

FIG. 4 illustrates a circuit arrangement for the acquisition of the noise signal which is likewise used as a criterion for disturbances in the locating system. The low-frequency measuring signal LF incoming on the telephone line in the locating central control passes, via a decoupling resistor R11 to an oscillating circuit L11, C11 which is tuned to a frequency of, for example, 5 kHz. Here, a frequency is selected which is not present in the normal LF signal, but can only occur as noise. If such as noise voltage is present, it is rectified with a diode D11, is filtered by way of a capacitor C12, a resistor R12 and a capacitor C13, and as a d.c. voltage $U_{R1}$ is compared at the input of an amplifier V11 with a comparison voltage $U_{RO}$ which is established by means of a voltage divider comprising a pair of resistors R13 and R14. If the voltage $U_{R1}$ is smaller than the voltage $u_{RO}$, the output of the amplifier V11 is positive, a diode D12 connected thereto is blocked and the signal rf at the output is positive. If, on the other hand, the voltage $U_{R1}$ is greater than the voltage $U_{RO}$, the output of the comparator V11 becomes negative, the diode D12 becomes conductive and the signal rf for "noise" becomes negative. Therefore, a fault signal for "noise" occurs when rf is negative.

FIG. 5 illustrates a circuit arrangement for the acquisition of the fault signal for a level fault (the signal pf in FIG. 1). The level monitoring unit serves to monitor the telephone lines incoming from the permanent station receivers. The level fault signal appears whenever a given level range is overshot or undershot. In this case, the measuring signal emanating from the telephone line is first of all distortion-corrected, is amplified and is fed to an input DUE of the level monitoring unit. With the aid of a pair of amplifiers V21 and V22 the level is again amplified, and the signal is rotated by 180° at the output of the amplifier V22. Thus, a full-wave rectification is effected with the subsequently connected diodes D21 and D22. The signal now passes to a low-pass filter chain comprising a plurality of capacitors C21, C22, C23, a pair of resistors R27 and R28, and a discharge resistor R29. The filter chain is designed, for example, for a cut-off frequency of 900 Hz. The d.c. voltage obtained in this manner is now compared with voltage thresholds which are permanently set by way of a voltage divider comprising a plurality of resistors R30, R31, and R32. If the voltage at a measuring point M1 exceeds the voltage at the junction of the resistors R30 and R31, an operational amplifier V23 trips and a luminescence diode D23 displays an excess voltage condition. If the voltage at the measuring point M1 falls below the voltage at the junction of the resistors R31 and R32, an operational amplifier V24 triggers and a luminescence diode D24 displays an undervoltage condition. In both cases, a level fault signal pf is to be analyzed. For this purpose, the outputs of the operational amplifiers V23 and V24 are logically linked to a Schmitt trigger in a NAND circuit ND21 and subsequently inverted by way of an inverter element IN21. The signal pf appearing at the output is subjected to further analysis in accordance with the arrangements of FIGS. 1 and 2, in order to obtain the disturbance report.

Although we have disclosed our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of out contribution to the art.

We claim:

1. A process for fault recognition in a vehicle locating system for a plurality of vehicles, the system having at least three receiving stations and a central station, the vehicles being called one after another by a calling transmitter having an address signal and each vehicle emitting a constant measuring signal after being called, the measuring signals being received by the receiving stations and relayed to the central station by way of lines for the purpose of comparison of time delay, comprising the steps of:

monitoring parameters of the measuring signals with respect to respective references in the individual receiving stations;

producing error signals corresponding to the deviations of the measuring signals from the references;

transmitting the error signals produced at all receiving stations to the central station;

logically combining the error signals with the address signal in the central station to produce a disturbance signal for a specific vehicle with the simultaneously occurring specific errors of all receiving stations.

2. The fault recognition process of claim 1, wherein the step of logically combining fault signals comprises the steps of:

counting fault signals relating to a specific fault; and emitting a disturbance report upon counting to a predetermined count.

3. The fault recognition process of claim 2, comprising the step of:

initiating a new count upon receipt of a fault-free measuring signal.

4. The fault recognition process of claim 1, comprising the steps of:
comparing the carrier frequency of the measuring signal with a reference frequency in each receiving station and producing a frequency error signal in response to deviation from the reference frequency; and
logically linking the frequency error signals of all receiving stations with the address signal via a coincidence element in the central station; and
producing a disturbance signal for the carrier frequency of the respective called-in vehicle when all receiving stations simultaneously determine a frequency error.

5. The fault recognition process of claim 1, comprising the steps of:
comparing the signal level of the measuring signal with a reference level in each receiving station and producing a level error signal in response to deviations between the measured signal level and the reference level;
logically linking all level error signals of all receiving stations with the address signal via a coincidence element in the central station; and
producing a disturbance signal for the low frequency level of the respective vehicle.

6. The fault recognition process of claim 1, comprising the steps of:
generating a radio noise reference at each receiving station and comparing the received radio noise of the measuring signal with that reference to produce a noise error signal in each receiving station;
logically linking the radio noise signals of all receiving stations with the address signal by way of a coincidence element in the central station; and
producing a disturbance signal and transmitting the same to the radio apparatus of the respective vehicle in response to receipt of a radio noise signal simultaneously in all receiving stations.

7. The fault recognition process of claim 1, comprising the steps of:
feeding the error signals of a specific receiving station to a coincidence element while feeding inverted error signals of all remaining receiving stations to the coincidence element; and
producing a disturbance signal for the respective receiving station in response to error signals of different vehicles determined by a single receiving station.

* * * * *